Sept. 29, 1953

J. C. ELGIN ET AL 2,653,915

PROCESSES OF RECLAIMING RUBBER, AND
RECLAIMED RUBBER PRODUCTS

Filed Feb. 3, 1951

INVENTOR.
JOSEPH CLIFTON ELGIN
EDWARD F. SVERDRUP
BY

Patented Sept. 29, 1953

2,653,915

UNITED STATES PATENT OFFICE 2,653,915

PROCESSES OF RECLAIMING RUBBER AND RECLAIMED RUBBER PRODUCTS

Joseph C. Elgin, Princeton, N. J., and Edward F. Sverdrup, Buffalo, N. Y., assignors to U. S. Rubber Reclaiming Co. Inc., Buffalo, N. Y.

Application February 3, 1951, Serial No. 209,287

27 Claims. (Cl. 260—2.3)

This invention relates to the reclaiming of rubber and to reclaimed rubber and to products formed from or containing the same.

This application is a continuation-in-part of our copending application Serial No. 193,688, filed November 2, 1950, of our copending application Serial No. 44,017, filed August 13, 1948, as a continuation in part of our copending application Serial No. 39,476, filed July 19, 1948, and of our copending application Serial No. 695,630 (now abandoned), filed September 9, 1946, and of our copending application Serial No. 727,276, filed February 7, 1947, which is a continuation-in-part of our application Serial No. 524,064, filed February 26, 1944, and issued as Patent No. 2,415,449, dated February 11, 1947. Application Serial No. 727,276 was abandoned subsequent to the filing of application Serial No. 39,476; application Serial No. 39,476 was abandoned subsequent to the filling of application Serial No. 44,017; and application Serial No. 44,017 was abandoned subsequent to the filing of the present application.

An object of the present invention is the provision of a process for reclaiming vulcanized natural and artificial rubbers whereby greatly improved economy and an improved product may be obtained. A further object is the provision of a process whereby reclaimed rubber of uniform quality may be effectively and expeditiously produced in quantity. Another object is the provision of an improved procedure for reclaiming mixtures of vulcanized materials. Another object is the provision of greatly improved reclaimed rubbers which approach the unvulcanized polymer in workability and utility, which has itself unique fields of utility, and which, alone or in combination with other ingredients, can be readily and effectively vulcanized or otherwise converted to a product which will have a long and effective life in any of a wide variety of useful applications.

In accordance with the present invention there is provided a continuous flexible process wherein all parts of the rubber progressively are subjected to a treatment adapted to devulcanize, i. e., to restore a plasticity similar to that of unvulcanized rubber, and the treatment in each part is terminated before the rubber can be undesirably affected. Thus, there is produced a reclaim of uniform quality and at a continuous rate. This process when used in the controlled-short-period process and the special oxido-reclaiming agents described and claimed in our Patents 2,415,449 and 2,593,279 among others permit a greater efficiency and improvement on said inventions by bringing each part of the rubber to the desired point on its plasticization curve and then arresting the action.

In accordance with the invention there are provided reclaims which have a high plasticity (a low Mooney viscosity) and, when vulcanized, a high tensile strength, a high percent elongation, and high abrasion resistance qualities (a low abrasion loss), and which have in certain instances a low thermal softening factor, a high capacity for assimilating such materials as clay and carbon black, a low power requirement in assimilating a load, a high degree of softness and smoothness, good processing and compounding characteristics, good extruding and tubing characteristics, and potentialities, when suitably compounded, of being vulcanized to a product having a number or all of the following qualities: a low torsional hysteresis loss, a long effective life, a high resilience, and/or a low torsional hysteresis loss, and long life; and other products having highly improved qualities.

Distinct characteristics of our product are that it possesses a consistently high quality factor as expressed by the ratio $$\frac{TE}{LV}$$

wherein T stands for tensile strength of the product when cured, E stands for percent elongation of the product when cured, L stands for abrasion loss of the product when cured, and V stands for Mooney viscosity, consistently high $$\frac{T}{V}$$

ratios, and consistently low abrasion-viscosity factors represented by $L \times V$, all when compared with the products of other processes produced from comparable vulcanized scraps with comparable quantities of the same type of added ingredients under comparable temperature conditions.

Reclaimed rubbers such as contemplated by the invention are identifiable by the presence of certain or all of the above and other qualities including good working characteristics, a relatively low gel content, a low swelling index, a relatively high resistance to water dispersion, a high cured chloroform extract value, a high softness and smoothness which do not interfere with the processing characteristics of the reclaim or the desirable properties of the vulcanized product, and, when vulcanized, by a low T-50 value. When suitably compounded and vulcanized, they yield products which are outstanding in desired ones of the following qualities in high degree: resistance to abrasion, low torsional hysteresis loss, and improved aging characteristics; their tensile, elongation, hot tensile, and flex resistance characteristics are high; and their hardness and modulus characteristics are good. They serve for use in tires and for other purposes as a highly satisfactory equivalent of raw rubber in admixture with synthetics and otherwise. They provide bases for products having outstanding utility in many industries, and they have qualities which enable their use, per se, for a wide range of purposes.

It will be appreciated that, as is the case with all rubbers—natural, synthetic, and reclaim—the properties of the vulcanized product will vary in accordance with the compounding and treatment. Different qualities are required for tube, tire-tread, side wall, carcass, mechanical goods, and other products; and the compounder will seek and obtain high qualities in those factors which are particularly important for the use to which the product is to be put. For example, high abrasion resistance and low hysteresis loss are both important in tire-tread products; whereas, in carcass products, low hysteresis loss would be of even more importance, but abrasion resistance would be of substantially no importance. The compounder who is seeking low hysteresis loss will design his compound to favor this factor rather than high abrasion resistance, whereas the compounder who is seeking high abrasion resistance will design his compound to favor the latter. By means of the present invention, however, the compounder who is seeking a low hysteresis loss factor is able to secure a vulcanized product with an exceptionally low hysteresis loss, and the compounder who is seeking a high abrasion resistance factor will be able to obtain an exceptionally high abrasion resistance. Improved aging and other qualities can also be obtained. The reclaim of the present invention has potentialities for use in exceptionally high quality vulcanized products embodying various combinations of desirable factors the most desired ones of which are present in an outstanding degree.

The reclaim of the invention may be identified, in certain instances, not only by characteristics such as just discussed, but also by other factors such, for instance, as its low water-dispersion characteristics when milled with ingredients which convert standard reclaims into products which will disperse readily in the presence of water; and also by its low T-50 values. T-50 values, as is well known in the art, are obtained by freezing an elongated sample of vulcanized rubber stretched to about 75% of its ultimate elongation. When it is thoroughly frozen, the clamps are released and the T-50 values are based on the temperature at which there has been sufficient thawing to return the sample to 50% of its original stretch. The test is also known as A. S. T. M. #D599-40T, a description of which may be found on page 76 of A. S. T. M. Standards on Rubber Products for March 1946, and a discussion of which may be found in Critical Analysis of T-50 Test in the India Rubber World for November 1939. Surprisingly, the reclaim of the present invention, when vulcanized in a usual manner, gives, at or near optimum cure, T-50 values considerably lower than standard reclaims, indicating that the product, instead of being merely a further development of known products, is a uniquely different material.

While special reclaims have in the past been obtained which were particularly high in certain particular ones of the above qualities, our reclaims tend to run consistently good in the foregoing and other qualities when compared with reclaims produced under comparable conditions by other processes.

The product of the present invention is believed to have a higher average molecular weight, narrower molecular weight distribution, and a less highly-branched, cyclicized, and cross-linked structure than the standard reclaims hitherto available.

We have found that these results are best obtained when the vulcanized rubber thoroughly mixed with the reclaiming agent (with or without other ingredients affecting the properties of the product) is passed continuously and progressively thru a closed apparatus in which it is heated, mechanically worked with a shearing action controlled so as to avoid actual shear—i. e., laminar fracture with consequent slippage of contiguous parts of the rubber mass relative to each other along their surface of contact—is protected from the atmosphere while hot, and after a relatively very short period of treatment, is cooled before, or as, it is discharged into the atmosphere.

It is important to give all parts of the vulcanized scrap full heating and working, and this can be advantageously accomplished, according to the present invention, by repeatedly passing the material thru clearances so small as to assume mechanical working of every particle and intimate contact thereof with a hot wall over which it is moved. After each such passage, the material is extruded into a larger space where the material is mixed and allowed time for action of heat and a reclaiming agent before being forced thru the next narrow clearance. The adjustment of the clearances and the number of points of close clearance controls to a large extent the quality of the reclaim and the production rate; the more points of close clearance, the less chance there will be that any particle can pass through the device without full treatment substantially equal to every other particle. Refining of the stock can be done in this same process, or, if desired, the stock may be given a further refining as in standard reclaiming practice.

The invention accordingly comprises an article of manufacture possessing the features and properties which will be exemplified in the article hereinafter described and the scope of the application of which will be indicated in the claims.

For a fuller understanding of the nature and objects of the invention, reference should be had to the following detailed description taken in connection with the accompanying drawings, in which.

Figures 1, 2:
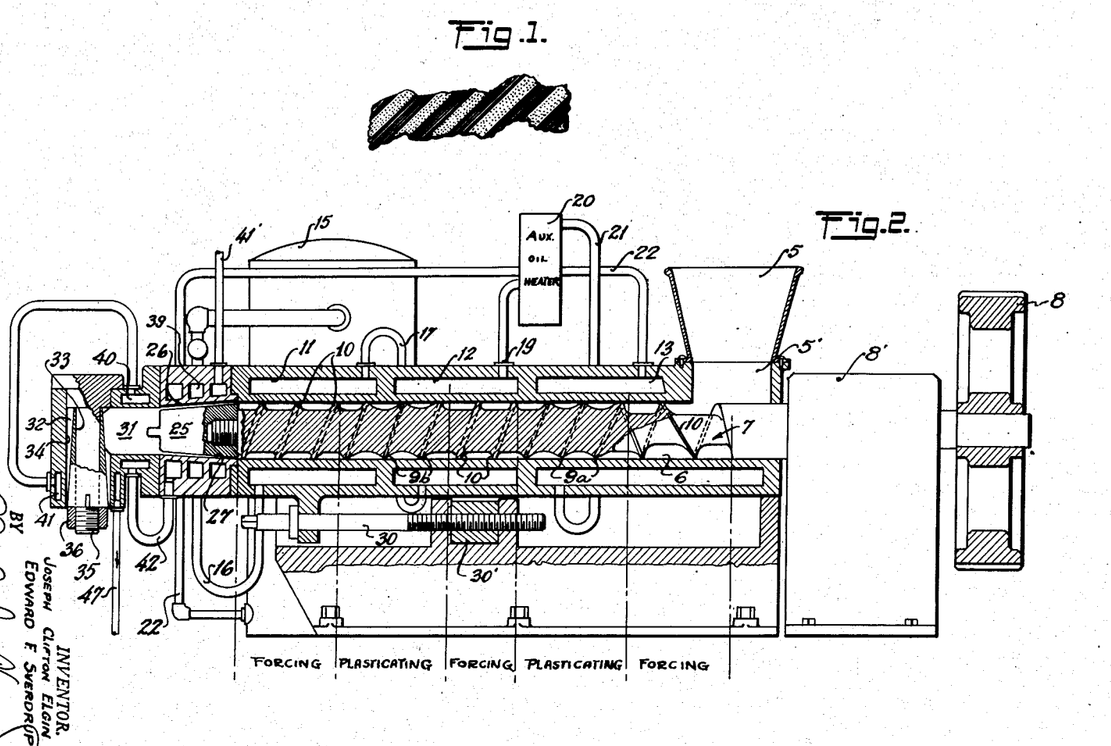
Figure 1 is a sectional view of one type of product embodying the invention.
Figure 2 is a longitudinal sectional view of one form of apparatus wherein the product may be produced.

The reclaimed rubber of the invention, as shown, for instance, in Fig. 1, is of greatly improved quality and has characteristics which are unique in the rubber reclaiming art.

One manner of production of such material of uniform quality and at a continuous rate is illustrated in Fig. 2 wherein the material to be reclaimed is supplied, in admixture with reclaiming agents and other ingredients, to a hopper 5 having a feed opening 5'. The material, still substantially at room temperature drops from the hopper 5 into a tubular chamber 6 in which is a screw type rotor 7. This screw is connected to suitable driving means through the drive gear 8 and speed reducer 8'.

In certain longitudinal portions of the chamber 6, there are provided, on the rotor, flights 9a and 9b having sloping, rounded contours, designed to provide for working of the material, thus permitting a portion of the material to work over the flights 9a and 9b. In other longitudinal portions of the rotor, its flights 10 are designed as a typical forcing screw so as to engage the material and feed it continuously along the chamber 6. The clearance at the tops of flights 9a and 9b may be $\frac{1}{32}$ of an inch. The depths and differences in contours in the several portions of the rotor are designed to produce mechanical working of the material while maintaining it in intimate relation with the wall of chamber 6, the temperature of which is controlled by fluid circulating in jacket portions 11, 12 and 13.

As exemplified in Fig. 2, wherein the parts are drawn substantially to scale, the three-inch diameter screw thread is formed to provide two "plasticating" sections 9a and 9b flanked by three "forcing" sections 10 as indicated. In these sections heat is rapidly developed by mechanical working of the material and friction against the moving parts, which provides (in connection with external heating or cooling if desired), the appropriate reclaiming temperature, e. g. around 400° F., or other temperature within the reclaiming range.

The temperature of the chamber 6 is controlled in the present instance by a jacket in which a suitable heat exchange fluid, e. g., oil, Dowtherm (eutectic of diphenyl and phenyl ether), or even steam, is circulated. As shown, three chambers 11, 12 and 13 surrounding the conduit make up the jacket for the chamber 6. A heater is provided in the thermostatic storage tank 15 for initial heating-up and for boosting the temperature of the heat-exchange fluid, if internal heating of the material should be insufficient. In operation, however, it is best to heat by mechanical working so that the jacket actually carries off heat and serves mainly as a temperature control means. The fluid runs through pipe 16 to chamber 11, through pipe 17 to chamber 12, through pipe 19 to an auxiliary or step-up heater 20, and thence through pipe 21 to chamber 13, returning to the thermostatic storage tank 15 through pipe 22. A pump (not shown) may be used.

At the discharge end of the screw part of rotor 7 and chamber 6, is an extrusion section composed of a conical extension 25 on the rotor 7 and an extension 26 of the chamber 6. The clearance between these parts is such that only well plasticized rubber flows through it, and such rubber is cooled by intimate contact, in thin section, with the wall 26. By virtue of the conical form, this section provides smooth tubular flow, and prevents laminar flow; but it is advantageous to increase the clearance progressively as the diameter decreases so that the area of the annular opening remains constant or even increases toward the small end of the cone. The area of this orifice, and, to a considerable extent also, its temperature, control the rate of flow of the material being treated.

From the zone 27 the material gathers in a chamber 31, whence it passes into the annular chamber 32, in which it is then subjected to further compacting by extrusion through the annular orifice between the cone 33 and the cylinder. This is adjustable by turning nut 36 on the threaded pin 35. This also produces back-pressure which affects the rate of flow, and assures the exclusion of air.

In the zones 27, 31 and 32 the temperature is reduced, by external cooling, from one within the reclaiming range (of over 325° F., e. g., 325°–425° F.) to one not over 325° F., and preferably lower. Dissipation of heat generated by mechanical action during extrusion through zone 27 and some cooling of the stock below its temperature in the active treating zone is thus carried out in zone 27.

The cone 25, the tube 34 and the conduit 31 are, respectively, cooled by jackets 39, 40 and 41 through which a cooling liquid, e. g., water at controlled temperatures, e. g. at about 175–195° F., is circulated from pipe 41' and by pipes 42 and 43. A discharge pipe 47 runs from jacket 41 to a recycle cooler and pump or to discharge.

Figure 3:
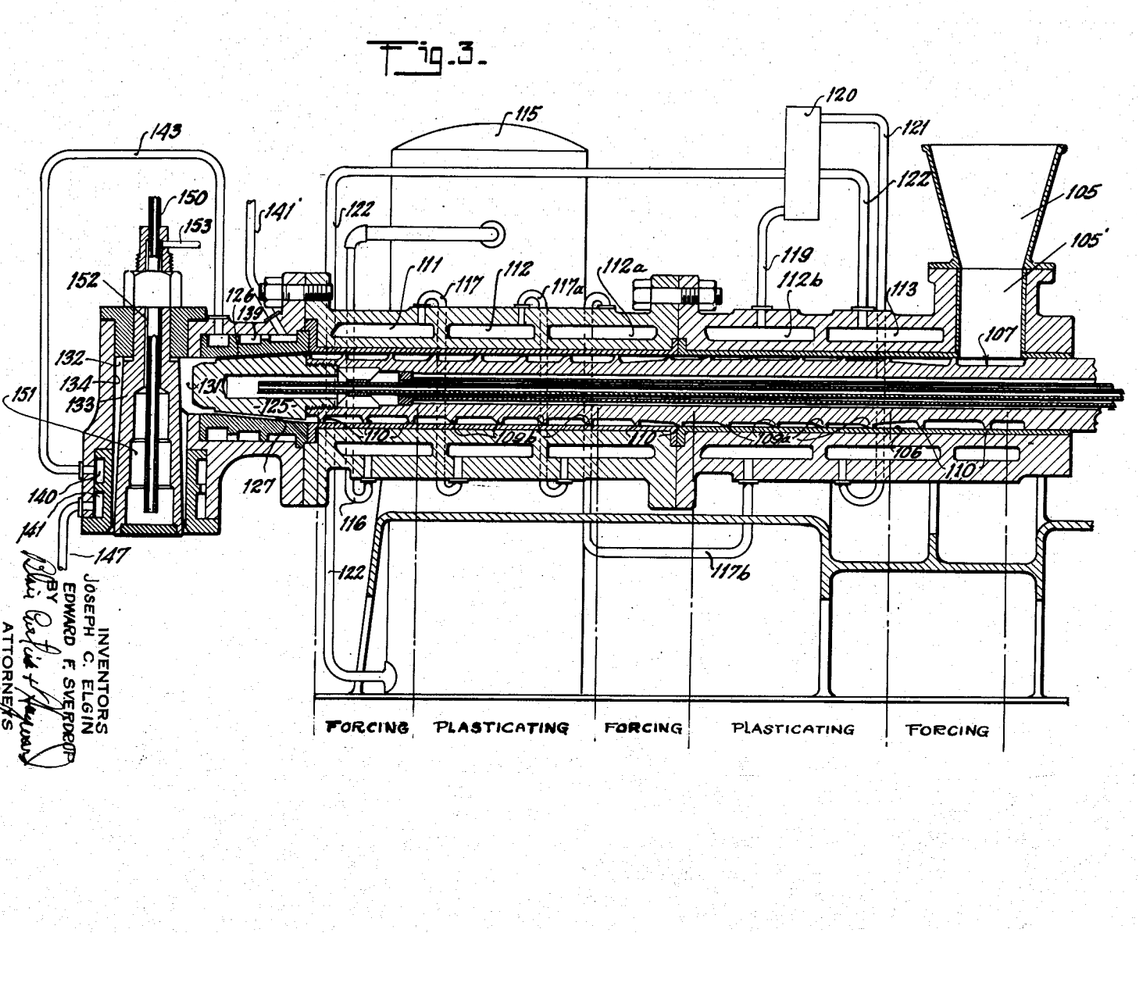
Figure 3 is a longitudinal sectional view of another form of apparatus well adapted for manufacture of the product.

The apparatus is drawn substantially to scale in Figure 3 for a 3" outer diameter screw. The space 27 between the cone 25 and the tube 26 may be about 0.030", but is adjustable by the bolt 30 engaging nut 30' secured to the bed of the machine. The orifice at the outlet of chamber 32 may be 2½" in external diameter and $2\frac{13}{32}$" in internal diameter.

We have found that the best results are obtained when the vulcanized rubber, thoroughly mixed with the reclaiming agent (with or without other ingredients affecting the properties of the product), is passed continuously and progressively through a closed apparatus in which it is heated, mechanically worked, protected from the atmosphere while hot, and, after a relatively very short period of treatment, is cooled before, or as, it is discharged into the atmosphere.

Best results are obtained by the use of screw means in a jacketed tubular vessel, whereby the material is treated in an annular passage between the screw and the vessel by repeated extrusion over the thread of the screw. The material in the tubular vessel or other heating chamber is advantageously maintained during treatment at a temperature known to be effective for reclaiming the particular materials being treated. Advantageously the material is treated in intimate contact with a channel wall held within a temperature range from approximately 300° F. to approximately 500° F. during the active treatment, and thus the temperature of the stock during treatment is kept under close control. Each part of the stock, in turn, remains under such temperature conditions for substantially the same time, which for best results should be not substantially less than one minute nor substantially more than twenty minutes. Reduction of the amount of reclaiming agent below an optimum amount (or its omission) requires higher temperatures; whereas with the preferred devulcanizing agents, softeners, etc., lower temperatures and higher working speeds can be used. Increasing the temperature above 400° F. adversely affects the tensile strength, but it does make a softer stock.

Heating is direct and internal, due to the internal mechanical working. The energy input rate for the types of material given below is advantageously of the order of 1.0 to 0.1 horsepower hours per pound of rubber. It is an important advantage of this invention that during continuous production this power input remains substantially constant. In its more specific aspects the invention contemplates an energy input relative to the flow rate of about .15 to .83 horsepower hour per pound.

The stock after it leaves the treating zone should be cooled substantially below the treating temperature, in most instances below about 350° F., and advantageously below 300° F. As soon as possible after the rubber is discharged into the open atmosphere, it is advantageously cooled to approximately room temperature.

Rates of feeding and forcing of the material into and through the feeding zone, within the limits stated, depend to considerable extent upon the nature of the material being treated and of the added ingredients, the temperature at which the treating zone is maintained, the severity of the mechanical working to which the material is subjected, and the kind of product which is desired. For ordinary rubber reclaiming and using the preferred ingredients as specified herein the rate of flow is adjusted to give a time in the treating zone of two to three minutes.

Usual reclaiming agents may be used. The process is most advantageous, however, with the oxido-plasticization agents described in the prior applications mentioned above, or with other agents which tend to be effective in the splitting of rubber molecules and/or in controlling cross-linking. In particular, the invention in its more specific aspects contemplates the provision of products in the production of which lauryl mercaptan or other aliphatic mercaptans having not less than 10 nor more than 16 carbon atoms (for example, decyl, undecyl, lauryl, tetradecyl, or hexadecyl, mixtures thereof, or mixtures including one or more thereof). The use of branch-chain compounds (especially the tertiary compounds), gives especially desirable products. Excellent products also are those produced by the use of disulfides, thiophene compounds, etc.

Other materials may be used, such, for example, as mineral oils, pine tars, coal tars, resins, etc. Naftolen R–100, a commercial resinous product recovered from acid sludge of petroleum refining, Staybelite Resin, a hydrogenated rosin product in common use under that name, B Wood Rosin, Phillips Reclaiming Resin No. 1, a petroleum resin commercially offered to the reclaiming industry, stearic acid, oleic acid, 2-ethyl butyric acid, styrene monomer, may be used with good results.

The material to be rendered plastic—for instance vulcanized natural rubber, Buna S (GR–S), neoprene, other diolefin polymer materials, butyl rubber, or mixtures thereof with each other or with other materials, but advantageously free from textile fabric cord, etc.—should be premixed in comminuted form with desired oxido-plasticization agents and/or other devulcanizing agents, softeners, etc., at a temperature sufficiently low to avoid deterioration, preferably not over 250° F., and advantageously in presence of air. The mixture should be supplied to the reclaiming apparatus in finely divided form. The vulcanized rubber scrap should be cleaned and ground in the usual way, advantageously to a fineness of 12, 24, or, better, 36 mesh, and be free from metal or other foreign ingredients which might injure or interfere with the reclaiming apparatus. This crumb rubber, mixed with reclaiming agents, softeners, etc., is supplied in sufficient quantity to keep the working space of the reclaiming apparatus filled and to maintain a continuous flow through it. When oxido-plasticizing agents according to the said prior applications are used in the present process, they are advantageously premixed with the stock in the presence of oxygen at temperature below about 250° F. In general, however, it is feasible also to supply all materials continuously in proper proportion and to rely on the mechanical working of the plasticator apparatus for mixing.

By mixing with an oxido-plasticization agent in the presence of air, sufficient oxygen for activating the agent so as to bring about the desired plasticizing reactions including chain-scission is incorporated, and when the material enters the reaction chamber it is compacted by the worm, and the reactions occur in the substantial absence of air. Thus the oxidation reactions are controlled, and the material protected against excessive oxidative degradation.

Once the desired reactions have taken place, the product should be cooled quickly to bring about the transformation of the material from its reactive state to a stable condition. When the treatment is complete, the material is cooled by extrusion through a cooled orifice; or the hot material may be extruded into a cool inert gas (e. g. $CO_2$) or a cooling liquid, such for example as water, which may be flowed or sprayed or merely maintained as a cooling bath. The treated material may also be fed down into a standard cool mill; or cooled by other suitable treatment. Storage temperatures should be not appreciably above room temperature.

In the provision of the products contemplated by the present invention in its broader aspects, no particular form of apparatus or treatment is essential. Furthermore, a machine may be varied considerably so long as the extrusion orifice is sufficiently small with respect to the worm capacity so that the material will be compacted within the chamber by the worm so as to substantially exclude air, and so long as working as well as forcing of the material is achieved.

Certain of the products exemplified hereafter were made on a machine such as illustrated in Fig. 3. The worm diameter is six inches (instead of three inches), with the other dimensions drawn substantially to scale in Fig. 3. The parts are designated by reference numerals such as those used in Fig. 2, but preceded by 10 in the case of single digit numbers, and by 1 in the case of double digit numbers. Thus, for instance, the machine includes a hopper 105, a tubular working and forcing chamber 106, and a worm 107. Besides the temperature-control chambers 111, 112, 113 there are inserted, between the chamber 112 and the chamber 113, two chambers 112a and 112b, respectively. Piping 117 connects the chamber 112 with the chamber 112a, piping 117a connects the chamber 112a with the chamber 112b, and piping 117b connects the chamber 112b with the chamber 113. A cone 125 and chamber-extension 126 are provided, and between the outer wall of the cone and the inner wall of the chamber 126 is an orifice 127; and there is a further orifice 132 between the outer surface of a cone 133 and the inner surface of a tube 134. The chamber 131 is fore-shortened, and the temperature-control chamber 140 is formed in the tube 134. Internal cooling means in the form of an inlet tube 150, a cooling chamber 151, a return 152, and an outlet 153 are provided.

There is given below data on the screws of the machines of Figs. 2 and 3:

|  | Fig. 2 | Fig. 3 |
|---|---|---|
| Screw diameter | 3″ | 6″ |
| 1st forcing section: |  |  |
| Length | 7½″ | 14″ |
| Valley depth | ½″ tapering to 9/32″ | 5/8″ tapering to 5/32″ |
| 1st plasticating section: |  |  |
| Length | 6″ | 13½″ |
| Valley depth | 9/32″ | 5/32″ |
| 2nd forcing section: |  |  |
| Length | 4″ | 10″ |
| Valley depth | 3/16″ | 15/32″ |
| 2nd plasticating section: |  |  |
| Length | 6″ | 13½″ |
| Valley depth | 11/32″ | 15/32″ |
| 3rd forcing section: |  |  |
| Length | 3½″ | 11⅞″ |
| Valley depth | 3/8″ | 15/32″ |

Using the machine of Fig. 3, flow rates of between 280 and 300 pounds per hour have been obtained with an oil temperature through the piping 116—122 of 280° F. at an oil flow of 9 gallons per minute. Temperatures below 280° F. tend to lower the rate of extrusion, and temperatures as high as 330° F. have tended to result in unsteady operating conditions. An oil temperature of 320° F. is desirable if the oil flow is raised above 11 gallons a minute. The water flow rate in the piping 141′—147 is desirably between one and one and one-half gallons per minute at a temperature about 208° F. for a production rate of 280–300 pounds per hour. Flow rates as high as 400–500 pound range in this machine are effective in yielding the product of the invention.

By way of showing certain advantages of the invention, certain comparative data are given hereafter. For this purpose a standard reclaim is here identified for purposes of later comparison.

"STANDARD"

A standard commercial reclaim made by treating natural rubber peels in pans for five hours in open steam at 363° F. following a gradual rise in heat during an initial hour and one-half, refining twice, straining through 70 plate, and finishing at a maximum gauge of 0.008 inch was used.

This, mixed with 50% of fresh GR–S compound and vulcanized for the number of minutes and at the temperatures indicated under "Cure" below, gave the results indicated under the word "Standard" below.

PROCESS 1

| Formulation | Parts by weight |
|---|---|
| No. 1 peels natural rubber, 24 mesh | 47.50 |
| No. 1 peels Buna S, 24 mesh | 47.50 |
| n-lauryl mercaptan | 1.00 |
| Engine oil | 1.50 |
| Solvesso No. 3 | 1.50 |
| Oleic acid | .25 |
| di-secondary butyl catechol | .75 |
| water | 1.50 |

The above mix was processed in the plasticator of Fig. 2 at 40.2 pounds per hour at a temperature of 350° F., worm speed 104 R. P. M. The process time (for each part of the product) was about 4.73 minutes.

Example 1

The product of Process 1.

DIRECT ABRASION TESTS (RECLAIMERS' ASSOCIATION FORMULA)

|  | "Standard" | | "Example 1" | |
|---|---|---|---|---|
|  | Loss in cc./HPH | Hardness | Loss in cc./HPH | Hardness |
| 25′ @ 40# | 807 | 57 | 645 | 50 |
| 30′ @ 40# | 831 | 58 | 675 | 52 |

5/0–E paper, (Cutrite Production paper, lot U538T), was used.

The Reclaimers' Association Formula (sometimes abbreviated as "RAF"), is as follows:

| | |
|---|---|
| Reclaim (50% hydrocarbon) | 200.00 |
| Zinc oxide | 5.00 |
| Captax (mercaptobenzo thiazole) | 0.50 |
| D. P. G. (di-phenyl guanidine) | 0.20 |
| Stearic acid | 2.00 |
| Sulfur | 3.00 |

The cures as indicated are for 25 minutes at 40 pounds of steam (287° F.) and at 30 minutes at 40 pounds of steam.

The abrasion tests set forth herein were performed on a machine such as disclosed on pages 674–677 of volume 19 of Industrial and Engineering Chemistry.

PROCESS 2

| Formulation | Parts by weight |
|---|---|
| No. 1 Natural rubber peels (tire treads peeled from the carcass) ground to size adapted to pass a 24-mesh screen | 95.00 |
| Tertiary dodecyl mercaptan | .50 |
| Petroleum solvent (Solvesso No. 3*) | 1.50 |
| Engine oil (Topsall No. 62) | 1.50 |
| Lecithin (clearate) | .50 |
| Water | 1.50 |

*Process.*—48 pounds per hour in the machine of Fig. 2, which corresponds to 3.87 minutes at 365° F. The worm speed was 48 R. P. M. The stock was refined once at .0035 inch maximum spacing between refining rolls.

* A high aromatic petroleum naphtha of boiling range 345–410° F. with a specific gravity of 0.883, an aniline point of 22.7, a flash point of 130° F., an initial boiling point of 347° F., a 50% boiling point of 373° F. and a final boiling point of 412° F. and containing 95% aromatics.

Example 2

The product of Process 2.

Chemical analysis:

| | |
|---|---|
| Acetone extract | 13.1 |
| Ash | 4.69 |
| Free sulfur | .03 |
| Total sulfur | 1.82 |
| Carbon black | 28.3 |
| Rubber content | 42.9 |
| Moisture | .57 |
| Specific gravity | 1.126 |

| Cured with 5.0 parts of sulfur | Tensile | Elongation |
|---|---|---|
|  | *Pounds* | *Percent* |
| 20′ at 45# | 370 | 320 |
| 40′ at 45# | 520 | 300 |
| 60′ at 45# | 625 | 305 |

| Cured with 50% RAF | Abrasion loss (5/0–E paper) |
|---|---|
| 25′ at 40# | 640 |
| 30′ at 40# | 614 |

A product of Process 2 gave a Williams plasticity of 4.84, a Mooney viscosity (ML/180/1.5–1) of 71, a Mooney viscosity (ML/212/6/1) of 58, (ML/180/6/1) of 70 (both Mooneys taken ten days after reclaiming), a thermal softening factor (change in the last two Mooney viscosities with temperature) of .375. ("ML" signifies that the larger of the two standard Mooney rotors was used. "180" or "212" indicates the temperature in degrees Fahrenheit, the first figure thereafter indicates the warming-up time, and the final figure the time of the test.). When cured (RAF 50%, i. e. where the reclaim contains 50% hydrocarbon) it gave an abrasion loss as follows: (In this test Minnesota Mining paper 8/0–280, lot UT4 aluminum oxide grit was used in this and the following examples. Abrasion figures obtained with 5/0–E paper may be converted substantially into figures for 8/0–280 paper by dividing by 1.35.)

| | Tensile | Elongation | Abrasion loss | Hardness |
|---|---|---|---|---|
| 25' at 40#  | | | 518 | 47 |
| 30' at 40#  | 1,248 | 320 | 497 | 49 |

The quality factor is calculated as follows:

$$\frac{1{,}248 \times 320}{71 \times 497} = 11.3$$

A torsional hysteresis figure of 0.086 was obtained.

A product of Process 2, having a Mooney viscosity (ML/180/1.5–1) at the time of load testing, of 71, assimilated 500 grams of[1] Suprex Clay per 500 grams of reclaim, on a 12" x 6" mill of 1:1.3 roll ratio, and required a maximum of 4.29 horsepower while mixing in the last 100 grams of this amount, and a maximum of 4.29 horsepower when the load was all mixed in. (4% of stearic acid was added on the clay.)

When this compound was vulcanized (1% of Zenite A, 1% of stearic acid, 3% of zinc oxide, and 3% of sulphur, had been added on an assumed RHC-rubber hydrocarbon content of 50%) for 10 minutes at 307° F., the durometer reading was 83, the tensile strength was 923 pounds, and the elongation was 110%.

PROCESS 3

| Formulation | Parts by weight |
|---|---|
| No. 1 GR-S peels ground to 24 mesh | 95.00 |
| Tertiary dodecyl mercaptan | 1.50 |
| PRR No. 1* (Phillips) | 18.00 |
| Petroleum solvent (Houdry naphtha) | 1.50 |
| Lecithin (clearate) | .50 |
| Water | 1.50 |

* A petroleum resin containing about 65% non-volatile solids, having an initial boiling point of 380° F. and boiling point of 460° F. after 20% distillation, and having an iodine number of 190, an API gravity of 15–18, a specific gravity of 0.97–0.95, a fire point of 190° F. per min., a flash point of 175° F./min., and a viscosity at 77.9° F. (Stormer: 100 gr. wt. 100 rev.-sec. 35–40).

[1] A hard rubber makers clay having approximately the following analysis:

| | |
|---|---|
| Loss on ignition | 14.00 |
| Silica | 41.50 |
| Iron and aluminum oxides | 43.00 |
| Calcium oxide | 1.50 |
| Magnesium | None |
| | 100.00 |

The fineness specification is: less than 0.5% retained on a 200 mesh standard test sieve.

Process.—43.5 pounds per hour in the machine of Fig. 2, which corresponds to 4.27' at 386° F. The worm speed was 60 R. P. M. The stock was refined once at .0035" maximum spacing between refining rolls.

Example 3

The product of Process 3.

Raw.—A soft, smooth reclaim having a Williams plasticity number of 4.81 (3' at 70° C.).

Chemical analysis:
| | |
|---|---|
| Acetone extract | 21.45 |
| Cured: Chloroform extract | 4.86 |
| Ash | 4.13 |
| Total sulfur | 1.75 |
| Carbon black | 24.28 |
| Rubber hydrocarbon | 6.49 |
| GR-S hydrocarbon | 36.95 |
| Specific gravity | 1.128 |

Cured in Reclaimers' Association Formula:

| | Tensile | Elongation | Hardness | Abrasion loss, cc./HPH |
|---|---|---|---|---|
| 20' at 287° F | 864 | 423 | 40 | |
| 25' at 287° F | 912 | 387 | 41 | 912 |
| 30' at 287° F | 1,054 | 393 | 43 | 819 |

After a thirty-minute cure (RAF 50%) a torsional hysteresis figure of 0.110 was obtained.

A product of Process 3, having a Mooney viscosity at the time of load testing (ML/180/1.5/1/17)—i. e., measured seventeen days after reclaiming of 71, assimilated 700 grams of Suprex clay per 500 grams of reclaim, on a 12" x 6" mill, and required a maximum of 5.37 horsepower while mixing in the last 100 grams of this amount, and a maximum of 5.04 horsepower when the load was all mixed in (4% of stearic acid was added on the clay). When this compound (containing the clay) was vulcanized (1% of Zenite A, 1% of stearic acid, 3% of zinc oxide and 3% of sulfur had been added on an assumed rubber hydrocarbon content of 50%), for 10 minutes at 307° F., the durometer reading (hardness) was 85, the tensile strength was 535 p. s. i. (pounds per square inch), and the elongation was 80%.

This product had a thermal softening factor of .188 derived from Mooneys (ML/180/6/1/45) of 42.5 and (ML/212/6/1/45) of 36.5.

When 50 parts by weight of the "standard" reclaim indicated above is used with 100 parts of the type of rubber indicated at the heads of the columns below in a compound suitable for tire sidewall, and the reclaim of Examples 2 and 3 are used with the type of rubber indicated at the heads of the columns below and in an otherwise respectively similar formulation and tested comparatively, the following results are obtained:

| Cure | "Standard" with natural rubber | | "Example 2" with natural rubber | | "Example 3" with GR-S | |
|---|---|---|---|---|---|---|
| | Tensile | Elongation | Tensile | Elongation | Tensile | Elongation |
| 20' at 45# | 2,680 | 530 | 2,900 | 520 | 2,680 | 565 |
| 30' at 45# | 2,480 | 490 | 2,800 | 520 | 2,840 | 570 |
| 45' at 45# | 2,370 | 495 | 2,700 | 520 | 2,700 | 540 |
| 90' at 45# | 2,050 | 470 | 2,620 | 540 | 2,380 | 530 |

The "T-300" tests below represent modulus characteristics, i. e., tensile at the point where the elongation is 300%.

| Cure | T-300 | T-300 | T-300 |
|---|---|---|---|
| 20' at 45# | 1,200 | 1,160 | 880 |
| 30' at 45# | 1,160 | 1,180 | 960 |
| 45' at 45# | 1,060 | 1,120 | 960 |
| 90' at 45# | 980 | 960 | 840 |

HOT TENSILE (212° F.)

| Cure | Tensile | Elongation | Tensile | Elongation | Tensile | Elongation |
|---|---|---|---|---|---|---|
| 20' at 45# | 1,380 | 550 | 2,120 | 650 | 1,960 | 690 |
| 30' at 45# | 1,340 | 520 | 1,740 | 580 | 1,875 | 650 |
| 45' at 45# | 1,350 | 520 | 1,850 | 580 | 1,710 | 640 |
| 90' at 45# | 1,300 | 575 | 1,700 | 565 | 1,460 | 655 |

AGED 95 HOURS IN OXYGEN BOMB

| Cure | "Standard" with natural rubber | | "Example 2" with natural rubber | | "Example 3" with GR-S | |
|---|---|---|---|---|---|---|
| | Tensile | Elongation | Tensile | Elongation | Tensile | Elongation |
| 20' at 45# | 1,870 | 390 | 2,150 | 430 | 1,960 | 475 |
| 30' at 45# | 1,720 | 370 | 1,650 | 380 | 1,875 | 440 |
| 45' at 45# | 1,580 | 350 | 1,760 | 360 | 1,710 | 410 |
| 90' at 45# | 1,480 | 335 | 1,760 | 385 | 1,465 | 400 |

TORSIONAL HYSTERESIS

| 20' at 45# | 0.066 | 0.061 | 0.067 |
|---|---|---|---|
| 30' at 45# | .065 | .057 | .066 |
| 45' at 45# | .068 | .057 | .067 |
| 90' at 45# | .076 | .065 | .075 |

T-50

| 20' at 45# | −14.8 | −19.3 | −18.8 |
|---|---|---|---|
| 30' at 45# | −21.0 | −26.0 | −22.5 |
| 45' at 45# | −23.8 | −28.6 | −24.2 |
| 90' at 45# | −26.3 | −29.6 | −25.2 |

PROCESS 4

| Formulation | Parts by weight |
|---|---|
| Peeled #1 tire recaps (24 mesh) | 95.00 |
| Tertiary dodecyl mercaptan | .50 |
| Naphtha (Houdry) | 1.50 |
| Petroleum resin (Phillips PRR #1) | 8.00 |
| Lecithin (clearate) | .50 |
| Water | 1.50 |

Process.—45 lbs. per hour in the machine of Fig. 2, which corresponds to 4.13 min. at 364° F. The worm speed was 60 R. P. M. The stock was refined once at 0.0035" maximum spacing between refining rolls.

*Example 4*

The product of Process 4. The qualities of this reclaim as evidenced in a compounding with natural rubber similar to that of the tests immediately above are listed below in comparison with Example 3 compounded similarly.

| Cure | Example 4 | | | Example 3 | | |
|---|---|---|---|---|---|---|
| | T | T-300 | E | T | T-300 | E |
| 20' at 45# | 2,820 | 990 | 590 | 2,790 | 830 | 600 |
| 30' at 45# | 2,920 | 1,030 | 575 | 2,720 | 1,000 | 550 |
| 45' at 45# | 2,680 | 1,050 | 545 | 2,620 | 970 | 550 |
| 90' at 45# | 2,500 | 920 | 570 | 2,490 | 880 | 540 |

HOT TENSILE (212° F.)

| | Tensile | Elongation | Tensile | Elongation |
|---|---|---|---|---|
| 20' at 45# | 2,030 | 725 | 2,030 | 670 |
| 30' at 45# | 1,650 | 620 | 1,440 | 565 |
| 45' at 45# | 1,900 | 640 | 1,760 | 620 |
| 90' at 45# | 1,600 | 610 | 1,320 | 525 |

T-50

| Cure | Example 4 | Example 3 |
|---|---|---|
| 20' at 45# | −10.8 | −8.8 |
| 30' at 45# | −20.2 | −16.8 |
| 45' at 45# | −23.3 | −20.7 |
| 90' at 45# | −25.5 | −22.8 |

PROCESS 5

| Formulation | Parts by weight |
|---|---|
| 24 mesh natural peels | 95.00 |
| Tertiary dodecyl mercaptan | .50 |
| Engine oil | 1.50 |
| No. 132 solvent | 1.50 |

Process.—In the machine of Fig. 3 a rate of 380# per hour at 40 R. P. M. (2.3' at 396° F.).

*Example 5*

The product of Process 5. When 100 parts by weight of the product are mixed with the following compounding ingredients:

| | |
|---|---|
| Reclaim | 100.00 |
| P-33 carbon | 5.00 |
| Pine tar | 5.00 |
| Zinc oxide | 2.50 |
| Mercaptobenzo thiazole (Captax) | .25 |
| Diphenyl guanidine (DPG) | .10 |
| Sulfur | 1.50 |
| Stearic acid | 1.00 | and cured for the number of minutes indicated in the first column below at the temperature of saturated steam pressure indicated in the second column, there are obtained the following results:

| Cure | | T | E | H | T-50, ° C. |
|---|---|---|---|---|---|
| Minutes | Steam pressure, pounds | | | | |
| 20 | 40 | 1,010 | 363 | 41 | −35.8 |
| 25 | 40 | 1,109 | 350 | 45 | −36.0 |
| 40 | 40 | 1,163 | 313 | 47 | −35.5 |
| 60 | 40 | 1,231 | 320 | 48 | −36.0 |

Here and hereafter T=tensile strength, E=elongation, and H=hardness.

After a thirty-minute cure (RAF 50%) a torsional hysteresis figure of 0.085 was obtained.

In comparison with the above results for Example 5 there are given similar figures for the "standard" pan process reclaim, the stock being identical, and the reclaim being similarly compounded.

| | T | E | H | T-50, ° C. |
|---|---|---|---|---|
| 20'/40# | 1,005 | 290 | 49 | −33.3 |
| 25'/40# | 1,004 | 270 | 51 | −33.3 |
| 40'/40# | 1,094 | 267 | 53 | −33.5 |
| 60'/40# | 1,143 | 257 | 55 | −34.0 |

A product of Process 5, having a Williams plasticity of 5.38, and a Mooney viscosity (ML/180/1.5-1-1), at the time of load testing, of 64, assimilated 500 grams of Suprex clay per 500 grams of reclaim, on a 12" x 6" mill of 1:1.3 roll ratio, and required a maximum of 4.51 horsepower while mixing in the last 100 grams of this amount, and a maximum of 4.51 horsepower when the load was all mixed in (4% of stearic acid was added on the clay).

A thermal softening factor of .375 was obtained for this product from Mooneys (ML/180/6/1/17) or 68, and (ML/212/6/1/17) of 54.

When this product was vulcanized (1% of Zenite A, 1% of stearic acid, 3% of zinc oxide, and 3% of sulfur, had been added on an assumed RHC of 50%) for 10 minutes at 307° F., the durometer reading was 82, the tensile strength was 868 pounds and the elongation was 100%.

Below are shown the results of comparative test on red inner tube reclaim random scraps:

PROCESS 6

| Formulation | Parts by weight |
|---|---|
| 12 mesh red inner tube scrap | 100.00 |
| Tertiary dodecyl mercaptan | .50 |
| No. 132 solvent | 1.50 |
| Water | 1.50 |

Process.—2.25 min. at 390° F.; equivalent. Produced at a rate of 400 pounds per hour in the machine of Fig. 3. The worm speed was 40 R. P. M. Finish 0.0035" max.

*Example 6*

The product of Process 6. This was tested in comparison with a pan process reclaim made from a vulcanized stock which, while not identical, was similar and of such character that it would be expected to yield a similar product. 100 parts by weight of this stock passing through a one-half inch mesh screen were mixed with 4.4 parts of #132 solvent, 5.0 parts of water, 4.4 parts of B Wood rosin, 0.50 part of Retardac 15-A (a stearic acid substitute manufactured by Wilmington Chemical Company), and 5.0 parts of ethanolamine, and treated in a pan for 6½ hours. During the first hour and one-half the temperature rose gradually to 363° F. and was maintained at this figure for the remaining five hours. It was refined twice, 0.004 and 0.0025" maximum gauge finish.

The cures were all made in the following formula:

| | |
|---|---|
| Reclaim (60% rubber hydrocarbon) | 100.00 |
| Zinc oxide | 3.00 |
| Mercaptobenzo thiazole | .30 |
| Di-phenyl guanidine | .12 |
| Sulfur | 1.80 |
| Stearic acid | 1.20 |
| | 106.42 |

| Cure | "Standard" T-50, ° C. | "Example 6" T-50, ° C. |
|---|---|---|
| 5'/40 lbs | −35.7 | |
| 7½'/40 lbs | −38.2 | −44.0 |
| 10'/40 lbs | −36.0 | −44.7 |
| 12'/40 lbs | −40.0 | −45.2 |

A product of Process 6, having Mooney viscosities taken eight days after reclaiming (ML/180/1.5-1) of 56, (ML/180/3-1) of 51, (ML/180/6-1) of 46, (ML/212/1.5-1) of 47 and (ML/212/3-1) of 42, and (ML/212/6-1) of 42.

This product had a thermal softening factor of 0.13 between (ML/180/6-1) and (ML/212/6-1).

COMPARATIVE DATA

Test Formula "A":
| | |
|---|---|
| Reclaim | 100.00 |
| P-33 carbon | 5.00 |
| Pine tar | 5.00 |
| Zinc oxide | 2.50 |
| Sulfur | 1.50 |
| Mercaptobenzo thiazole | .25 |
| Di-phenyl guanidine | .10 |
| Stearic acid | 1.00 |
| | 115.35 |

| Cure | "Standard" | | | "Example 5" | | |
|---|---|---|---|---|---|---|
| | T-50, ° C. | Free S, percent | Calculated combined S, percent | T-50, ° C. | Free S, percent | Calculated combined S, percent |
| 20' at 40# | −31.3 | 0.353 | 2.672 | −34.8 | 0.413 | 2.560 |
| 40' at 40# | −32.0 | .086 | 2.838 | −34.5 | .155 | 2.818 |
| 60' at 40# | −31.5 | .068 | 2.857 | −34.0 | .093 | 2.880 |
| Specific gravity | 1.169 | | | 1.161 | | |

ABRASION

| Cure | "Standard" | | "Example 5" | |
|---|---|---|---|---|
| | Loss in cc./HPH | Hardness | Loss in cc./HPH | Hardness |
| 20' at 40# | 892 | 52 | 892 | 40 |
| 40' at 40# | 820 | 56 | 760 | 48 |
| 60' at 40# | 834 | 58 | 690 | 48 |

Further tests were made with a tread type compound using natural rubber:

| Formulation "B" | Parts by weight |
|---|---|
| Smoked sheets | 60.00 |
| Reclaimed rubber | 80.00 |
| EPC (easy processing carbon) | 35.00 |
| Zinc oxide | 4.00 |
| Stearic acid | 3.00 |
| Thermoflex (anti-oxidant) | 1.00 |
| Dutrex No. 6 (softener) | 6.00 |
| Sulfur | 2.75 |
| Mercaptobenzo thiazole (captax) | 1.00 |

| Cure | "Standard" | | | | "Example 5" | | | |
|---|---|---|---|---|---|---|---|---|
| | Tensile | T-300 | Elongation | Hardness | Tensile | T-300 | Elongation | Hardness |
| 45' at 280° F | 2,781 | 1,491 | 477 | 63 | 2,744 | 1,088 | 520 | 59 |
| 60' at 280° F | 2,733 | 1,574 | 450 | 65 | 2,736 | 1,386 | 487 | 60 |
| 75' at 280° F | 2,675 | 1,626 | 433 | 64 | 2,713 | 1,453 | 470 | 60 |

TORSIONAL HYSTERESIS AT 285° F.

| | | |
|---|---|---|
| 45' at 280° F | 0.163 | 0.153 |
| 60' at 280° F | .167 | .158 |
| 75' at 280° F | .171 | .156 |

Formulation "C" is the same as formulation "B" but with 60.00 parts of GR-S substituted for the 60.00 parts of smoked sheets and with the sulfur reduced to 2.25 parts.

"STANDARD #5015"

The following data is for #1 Peels "Recaps" for another standard pan process reclaim (designated as #5015):

| Formulation | Parts by weight |
|---|---|
| No. 1 recap peels ½" | 100.00 |
| No. 132 solvent | 5.00 |
| PRR No. 1 | 4.00 |
| RPA No. 5 | .40 |
| Barrett tar | 3.00 |
| B wood rosin | 3.00 |
| Water | 180.00 |

*Process.*—5 hours at 388° F.
Mill as:
Product of above ______ 97.0
Clay __________________ 3.0
Refine ________________ .004" and .0025" max.
Finish ________________ .007

With this may be compared:

PROCESS 7

No. 1 recap peels 24 mesh ______ 95.00
Tertiary dodecyl mercaptan _____ 1.00
No. 132 Solvent ________________ 1.50
PRR No. 1 ______________________ 9.75

*Process.*—3' at 410° F. 300 #/hr. 40 R. P. M. in the machine of Fig. 3.
*Refine.*—.0035" maximum.

Example 7

The product of Process 7. These reclaims were tested in the same way as the natural rubber peels given above. In tests using Test Formula "A" above, the following results were obtained:

| Cure | "Standard #5015" | | | "Example 7" | | |
|---|---|---|---|---|---|---|
| | Tensile | Elongation | Hardness | Tensile | Elongation | Hardness |
| 20'/40# | 1,075 | 380 | 51 | 821 | 377 | 42 |
| 40'/40# | 1,170 | 333 | 56 | 924 | 330 | 46 |
| 60'/40# | 1,197 | 333 | 56 | 920 | 320 | 48 |

AGED 24 HOURS AT 100° C.

| | Tensile | Elongation | Hardness | Tensile | Elongation | Hardness |
|---|---|---|---|---|---|---|
| 20'/40# | 1,162 | 210 | 64 | 1,004 | 200 | 60 |
| 40'/40# | 1,153 | 200 | 65 | 1,013 | 200 | 61 |
| 60'/40# | 1,129 | 210 | 65 | 1,015 | 207 | 61 |

| Specific gravity | 1.197 | 1.172 |
|---|---|---|

ABRASION

| | Loss, cc./HPH | H | Loss, cc./HPH | H |
|---|---|---|---|---|
| 20'/40# | 1,002 | 55 | 973 | 43 |
| 40'/40# | 963 | 59 | 992 | 47 |
| 60'/40# | 1,035 | 60 | 942 | 48 |

In Formulations "B" and "C" above the following results were obtained:

NATURAL COMPOUND—FORMULATION "B"

| Cure | "Standard #5015" | | | | "Example 7" | | | |
|---|---|---|---|---|---|---|---|---|
| | Tensile | Elongation | Hardness | T-300 | Tensile | Elongation | Hardness | T-300 |
| 30' at 280° F | 2,548 | 590 | 58 | 918 | 2,601 | 620 | 55 | 896 |
| 45' at 280° F | 2,642 | 537 | 60 | 1,111 | 2,767 | 570 | 58 | 1,069 |
| 60' at 280° F | 2,546 | 507 | 61 | 1,215 | 2,657 | 523 | 60 | 1,164 |
| 75' at 280° F | 2,567 | 500 | 62 | 1,248 | 2,775 | 527 | 61 | 1,249 |

GR-S COMPOUND—FORMULATION "C"

| 30' at 280° F | 864 | 503 | 54 | 502 | 976 | 510 | 53 | 562 |
|---|---|---|---|---|---|---|---|---|
| 45' at 280° F | 1,514 | 537 | 58 | 765 | 1,586 | 527 | 56 | 788 |
| 60' at 280° F | 1,847 | 510 | 60 | 967 | 1,865 | 483 | 59 | 1,008 |
| 75' at 280° F | 1,959 | 480 | 61 | 1,058 | 1,996 | 477 | 60 | 1,095 |
| 90' at 280° F | 1,980 | 470 | 60 | 1,164 | 1,981 | 473 | 59 | 1,117 |

NATURAL COMPOUND—FORMULATION "B"

[Torsional hysteresis at 285° F.]

| 45' at 280° F | 0.217 | 0.194 |
|---|---|---|
| 60' at 280° F | .214 | .191 |
| 75' at 280° F | .220 | .197 |

GR-S COMPOUND—FORMULATION "C"

[Torsional hysteresis at 285° F.]

| Cure | "Standard No. 5015" | "Example 7" |
|---|---|---|
| 45' at 290° F | 0.195 | 0.173 |
| 60' at 290° F | .187 | .161 |
| 75' at 290° F | .178 | .160 |

CURED CHLOROFORM EXTRACT

| "Standard No. 5015" | "Example 7" |
|---|---|
| 2.08% | 2.48% |

GEL CONTENT

| "Standard No. 5015" | "Example 7" |
|---|---|
| 75.5% | 70.9% |

SWELLING INDEX

| "Standard No. 5015" | "Example 7" |
|---|---|
| 813 | 734 |

T-50

| Cure | "Standard No. 5015" | "Example 7" |
|---|---|---|
| | ° C. | ° C. |
| 20' at 40# | −27.5 | −29.9 |
| 40' at 40# | −25.5 | −28.0 |
| 60' at 40# | −24.1 | −28.6 |

When 100 parts by weight of GR-S rubber are mixed with 58 parts by weight of the reclaims indicated at the heads of the column below and used respectively in a similar formulation and tested, the following comparative results are obtained:

| Cure | Example 2 Natural | | | Example 3 GR-S | | | Example 4 Recaps | | |
|---|---|---|---|---|---|---|---|---|---|
| | Tensile | T-300 | Elongation | Tensile | T-300 | Elongation | Tensile | T-300 | Elongation |
| 30' at 45# | 2,000 | 820 | 505 | 2,000 | 580 | 610 | 1,630 | 630 | 525 |
| 45' at 45# | 2,000 | 800 | 515 | 2,100 | 640 | 625 | 1,710 | 700 | 525 |
| 60' at 45# | 1,900 | 840 | 510 | 1,720 | 680 | 535 | 1,640 | 790 | 480 |
| 120' at 60# | 1,460 | 720 | 460 | 1,660 | 660 | 530 | 1,580 | 800 | 460 |

HOT TENSILE (212° F.)

| | Tensile | Elongation | Tensile | Elongation | Tensile | Elongation |
|---|---|---|---|---|---|---|
| 30' at 45# | 745 | 330 | 665 | 330 | 635 | 335 |
| 45' at 45# | 755 | 340 | 645 | 330 | 620 | 315 |
| 60' at 45# | 670 | 300 | 450 | 250 | 620 | 305 |
| 120' at 60# | 460 | 245 | 450 | 260 | 505 | 265 |

FLEXOMETER

|  | Example 2 Natural | Example 3 GR-S | Example 4 Recaps |
|---|---|---|---|
| 60' at 45#__ | 40' | 43' | 43'-30" |
| 120' at 60#_ | 47'-45" | 43'-30" | 47'-15" |

TORSIONAL HYSTERESIS

|  | Example 2 Natural | Example 3 GR-S | Example 4 Recaps |
|---|---|---|---|
| 30' at 45#__ | 0.058 | 0.063 | 0.066 |
| 45' at 45#__ | .059 | .065 | .064 |
| 60' at 45#__ | .056 | .061 | .062 |
| 120' at 60#_ | .063 | .070 | .069 |

When 218 parts by weight of the reclaim below were used with 100 parts of natural rubber the following results were obtained:

| Cure | Example 2 Natural | | | Example 3 GR-S | | | Example 4 Recaps | | |
|---|---|---|---|---|---|---|---|---|---|
|  | Tensile | T-300 | Elongation | Tensile | T-300 | Elongation | Tensile | T-300 | Elongation |
| 30' at 45#__ | 860 | 360 | 455 | 1,480 | 260 | 650 | 1,310 | 380 | 600 |
| 45' at 45#__ | 700 | 340 | 435 | 1,340 | 280 | 600 | 1,130 | 380 | 560 |
| 60' at 45#__ | 660 | 300 | 440 | 880 | 280 | 500 | 960 | 370 | 520 |
| 120' at 60#_ | 500 | 240 | 450 | 480 | 280 | 390 | 560 | 360 | 430 |

HOT TENSILE (212° F.)

|  | Tensile | Elongation | Tensile | Elongation | Tensile | Elongation |
|---|---|---|---|---|---|---|
| 30' at 45#__ | 645 | 450 | 800 | 570 | 645 | 570 |
| 45' at 45#__ | 470 | 400 | 730 | 515 | 575 | 560 |
| 60' at 45#__ | 430 | 380 | 520 | 420 | 580 | 530 |
| 120' at 60#_ | 260 | 280 | 225 | 260 | 180 | 550 |

FLEXOMETER

|  | Example 2 Natural | Example 3 GR-S | Example 4 Recaps |
|---|---|---|---|
| 60' at 45#__ | 17' | 17'-45" | 26'-30" |
| 120' at 60#_ | 15'-30" | 9'-30" | 17'-30" |

TORSIONAL HYSTERESIS

|  | Example 2 Natural | Example 3 GR-S | Example 4 Recaps |
|---|---|---|---|
| 30' at 45#__ | 0.088 | 0.081 | 0.084 |
| 45' at 45#__ | .093 | .080 | .083 |
| 60' at 45#__ | .093 | .090 | .083 |
| 120' at 60#_ | .106 | .126 | .115 |

When 62.5 parts by weight of the "standard" reclaim indicated above (near the recital of Process 1) and the reclaims of Examples 2 and 3 are respectively mixed with 100 parts of GR-S rubber in a compound suitable for tire side wall, and tested comparatively the following results are obtained:

| Cure | "Standard" GR-S | | Example 2 Natural Rubber | | Example 3 GR-S | |
|---|---|---|---|---|---|---|
|  | Tensile | Elongation | Tensile | Elongation | Tensile | Elongation |
| 20' at 45#______ | 1,280 | 440 | 1,340 | 510 | 1,570 | 660 |
| 30' at 45#______ | 1,360 | 400 | 1,340 | 425 | 1,470 | 585 |
| 45' at 45#______ | 1,460 | 390 | 1,260 | 380 | 1,610 | 555 |
| 90' at 45#______ | 1,400 | 370 | 1,380 | 410 | 1,380 | 490 |

|  | T-300 | T-300 | T-300 |
|---|---|---|---|
| 20' at 45#______ | 800 | 700 | 500 |
| 30' at 45#______ | 960 | 860 | 640 |
| 45' at 45#______ | 1,060 | 940 | 700 |
| 90' at 45#______ | 1,060 | 940 | 740 |

TORSIONAL HYSTERESIS

| 20' at 45#______ | 0.114 | 0.101 | 0.104 |
|---|---|---|---|
| 30' at 45#______ | .102 | .092 | .095 |
| 45' at 45#______ |  |  | .091 |
| 90' at 45#______ | .097 | .088 | .092 |

Tests of Example 4 in comparison with Example 3 in a similarly proportioned compound give:

| Cure | Example 4 with #1 Recap Stock | | | Example 3 with Natural Rubber | | |
|---|---|---|---|---|---|---|
|  | Tensile | T-300 | Elongation | Tensile | T-300 | Elongation |
| 20' at 45#______ | 1,580 | 600 | 670 | 1,460 | 530 | 665 |
| 30' at 45#______ | 1,470 | 630 | 570 | 1,530 | 600 | 585 |
| 45' at 45#______ | 1,460 | 760 | 480 | 1,630 | 690 | 570 |
| 90' at 45#______ | 1,590 | 790 | 540 | 1,660 | 730 | 560 |

TORSIONAL HYSTERESIS

|  | "Example 4" | "Example 3" |
|---|---|---|
| 20' at 45#______ | 0.105 | 0.102 |
| 30' at 45#______ | .110 | .110 |
| 45' at 45#______ | .101 | .101 |
| 90' at 45#______ | .102 | .102 |

Using Formulation "C" above, a GR-S compound, the following hysteresis-loss results are secured:

| Cure | "Standard" | | | Example 5 | | |
|---|---|---|---|---|---|---|
|  | Power Loss | Indentation | Resilience | Power Loss | Indentation | Resilience |
| 80' at 280° F___ | 49.0 | 8.14 | 43.3 | 42.3 | 7.03 | 43.7 |
| 100' at 280° F___ | 48.4 | 8.01 | 43.7 | 44.2 | 7.35 | 43.3 |
| 120' at 280° F___ | 46.3 | 7.80 | 43.9 | 42.9 | 7.18 | 43.4 |

The terms used just above are explained further in detail just below:

Reference: The Vanderbilt 1942 Rubber Handbook, pages 297-299.

Definitions:

*Resilience.*—The ratio of the energy of rebound to the energy of fall.

*Indentation.*—The penetration corresponding to the standard force value. The sum of the energy of fall and energy of rebound divided by the penetration is known as the force value. The indentation is determined by plotting the penetrations against the force value for the various heights of drop and reading the indentation on the ordinate corresponding to the standard force value point on the plotted curve.

*Power loss.*—In the same manner energy loss that is the difference between the energy of fall and the energy of rebound, is plotted against force value and the power loss read on the ordinate corresponding to the standard force value on the plotted curve.

The products of the following processes also exemplify the invention in certain of its aspects and give highly satisfactory results.

PROCESS 8

Using the following formulation:

| | Parts by weight |
|---|---|
| No. 1 Peels natural rubber 24 mesh | 95.00 |
| Tertiary dodecyl mercaptan | .50 |
| Petroleum solvent (Solvesso No. 3) | 1.50 |
| Engine oil | 1.50 |
| Lecithin (clearate) | .50 |
| Water | 1.50 |

In the machine of Fig. 2 at a worm speed of 48 R. P. M. the temperatures were as follows:

300° F. in the intake pipe 16
320° F. in the outlet pipe 22
350° F. rear
361° F. center
362° F. forward
150° F. at the rear of the cone
144° F. at the forward end of the cone
326° F. at the die (i. e. chamber 31)

The stock moved through at a rate of 49.4 pounds per hour with a power input of 10.5 horsepower and a transit time of 3.8 minutes for passage of stock along the length of the chamber 6.

*Example 8*

The product was a good quality reclaim with a specific gravity of 1.143 and a plasticity number of 4.70.

A product of Process 8 when cured gave the following physicals:

| Cured with R. A. F. 50% | Tensile | Elongation | Hardness |
|---|---|---|---|
| 20/40 | 1,045 | 283 | 47 |
| 25/40 | 1,045 | 263 | 49 |
| 30/40 | 1,004 | 253 | 50 |

| | Abrasion (5/0-E paper) cc./HPH | |
|---|---|---|
| 20/40 | 755, | 45 |
| 25/40 | 733, | 46 |
| 30/40 | 763, | 48 |

PROCESS 9

Using the machine of Fig. 2 with extrusion into air, ninety-five parts of twelve mesh black bus and truck tube crumb were mixed with 2 parts of Rubbersol (a pine distillate containing about 40% terpinolene), 1.2 parts of stearic acid, 2.4 parts of B wood rosin, 0.5 part of monoethanol amine, 0.5 part of lecithin, and 1.5 parts of water and run through the machine at a worm speed of 60 R. P. M.

The temperatures were as follows:

253° F. oil inlet
273° F. oil outlet
279° F. rear
336° F. center
365° F. forward
350° F. at the die
174° F. at the forward end of the cone The stock was run through at a rate of 43.8 pounds per hour using 9.5 horsepower. The transit time for passage of stock from the feed end of the screw to the cooling chamber 27 was 4.3 minutes.

*Example 9*

The product had a specific gravity of 1.122 and a plasticity number of 3.85.

A product of Process 9 when cured gave the following physicals:

| Cure, RAF 70% | T | E | H |
|---|---|---|---|
| 5/40 | 1,754 | 637 | 38 |
| 10/40 | 2,072 | 590 | 45 |
| 15/40 | 1,934 | 530 | 48 |
| 20/40 | 1,856 | 500 | 49 |

PROCESS 10

A mix such as described in Process 9 was processed similarly in the same machine, the temperatures being as follows:

345° F. oil inlet
350° F. oil outlet
357° F. rear
411° F. center
407° F. forward
365° F. die
155° F. forward cone and was run through at a rate of 52.5 pounds per hour at approximately 10 horsepower and a transit time of 3.5 minutes.

*Example 10*

Product of Process 10, having a specific gravity of 1.12 gave a Williams plasticity of 2.79 and a Mooney viscosity (ML/180/1.5/1) of 58. When cured at 40 pounds of steam in a 70% RAF formula, a product of Process 10 gave the following physicals:

| Minutes | Tensile, pounds | Elongation, percent | Hardness |
|---|---|---|---|
| 5 | 1,527 | 647 | 38 |
| 10 | 2,077 | 590 | 48 |
| 15 | 1,684 | 490 | 53 |

When cured fifteen minutes with 70% RAF a torsional hysteresis figure of 0.089 was obtained.

PROCESS 11

Ninety-five parts by weight of 30 mesh natural rubber #1 peels were mixed with 0.5 part of tertiary lauryl mercaptan, 1.5 parts of Solvesso #3, 1.5 parts of engine oil, 0.5 part of lecithin, and 1.5 parts of water and run through the machine of Fig. 2 at a worm speed of 60 R. P. M.

The temperatures were as follows:

301° F. oil inlet
316° F. oil outlet
351° F. rear
370° F. center
368° F. forward
152° F. rear cone
158° F. forward cone
318° F. die.

The stock moved through at 52.9 pounds per hour with a power input of 11.2 horsepower and a transit time of 3.5 minutes.

*Example 11*

The product was an excellent quality reclaim with a specific gravity of 1.143 and a plasticity number of 4.70.

A product of Process 11 gave a thermal softening factor of .516 derived from Mooney viscosity figures (ML/180/6/1/17) of 70.5 and (ML/212/6/1/17) of 54.

PROCESS 12

Using the machine of Fig. 2 with extrusion into air, a mix of 95 parts by weight of twelve mesh crumb, Buna S hot water bottle scrap were mixed with one part of tertiary lauryl mercaptan, 1.5 parts of Solvesso No. 3, 1.5 parts of engine oil, 0.5 part of lecithin, 1.5 parts of water, was run through a machine as shown in Figure 2 with the rotor operating at 70 R. P. M. The temperatures were as follows:

322° F. oil inlet
342° F. oil outlet
376° F. rear
403° F. center
399° F. forward
307° F. die
241° F. forward cone The stock was run through at a speed of 25.4 pounds per hour 13.7 horsepower, and a transit time of 7 minutes.

*Example 12*

There was produced a flat product which, although dry and hard, had very desirable properties. The specific gravity was 1.478 and the plasticity number 6.10.

A product of Process 12 when cured gave the following physicals:

| R. A. F. 40% | T | E | H |
|---|---|---|---|
| 20/40 | 419 | 197 | 57 |
| 25/40 | 436 | 200 | 58 |
| 30/40 | 473 | 197 | 58 |

PROCESS 13

Using the machine of Fig. 2 with extrusion into air, a mix of 47.5 parts of twenty-four mesh Buna S tire tread peels and 47.5 parts of twenty-four mesh natural rubber peels were mixed with 0.5 part of tertiary lauryl mercaptan, 1.5 parts of Solvesso No. 3, 0.5 part of lecithin, 0.2 part of 2-ethyl butyric acid, and 1.5 parts of water, and passed through the machine with a worm speed of 60 R. P. M. and a cone clearance of 0.017". The temperatures were as follows:

307° F. oil inlet
329° F. oil outlet
384° F. rear
400° F. center
386° F. forward
417° F. die
204° F. forward cone The stock was run through at a rate of 73 pounds per hour and 15.1 horsepower. The transit time was 2.5 minutes. The product had a specific gravity of 1.168 and a plasticity number when refined of 4.62.

*Example 13*

The product of Process 13.

| Cure, R. A. F. 50% | T | E | H |
|---|---|---|---|
| 20/40 | 829 | 250 | 55 |
| 25/40 | 851 | 237 | 56 |
| 30/40 | 834 | 223 | 57 |

PROCESS 14

Using the machine of Fig. 2, with extrusion into air, a mix similar to that of Process 13, except that there were included also 5 parts of Naftolen R-100, was run through with a cone clearance of 0.018 at a speed of 45 pounds per hour at 12.6 horsepower and a transit time of 4.1 minutes.

*Example 14*

The product had a specific gravity of 1.155 and a plasticity number when refined of 4.56.

A product of Process 14 had a Mooney (ML/180/1.5/1) viscosity of 66.

| Cure, R. A. F. 50% | T | E | H | Abrasion Loss |
|---|---|---|---|---|
| 20/20 | 687 | 250 | 46 | |
| 25/40 | 710 | 237 | 54 | |
| 30/40 | 800 | 240 | 49 | 375 |

The quality factor is calculated as follows:

$$\frac{800 \times 240}{66 \times 375} = 7.8$$

PROCESS 15

Using a shorter, straight-line, machine with a 20" screw having a 1½" pitch reduced to ¾" forcing pitch at the last two inches. The thread is 5½" deep forcing, 7" plasticating, and 7½" shallow forcing. The cone pin tapers from 3" to 2" and is approximately 1¾" long. A die in line with the cone was used. 47.5 parts of 12 mesh Buna S peels and 47.5 parts of 12 mesh natural rubber peels were mixed with 1 part of tertiary lauryl mercaptan, 1.5 parts of Solvesso No. 3 and 0.5 part of lecithin and 1.5 parts of water and processed in the apparatus with a rotor speed of 70 R. P. M. The temperatures were as follows:

279° F. oil inlet
295° F. oil outlet
342° F. rear
342° F. forward
348° F. rear cone
251° F. forward cone
371° F. die The stock was run through at a rate of 22.1 pounds per hour at 9.2 horsepower and with a transit time of 8.4 minutes.

*Example 15*

The product on extrusion into air, yielded a good reclaim with a specific gravity of 1.173 and a plasticity number of 4.95.

When cured (RAF 50%) it gave the following physicals:

| Cure at 287° F. | T | E | H | Tortional Hysteresis |
|---|---|---|---|---|
|  | Pounds | Percent |  |  |
| 20' | 980 | 253 | 53 | |
| 25' | 986 | 233 | 54 | |
| 30' | 1,005 | 227 | 55 | 0.090 |

PROCESS 16

In a procedure similar to that of Process 14, 47.5 parts of 24 mesh natural rubber peels and 47.5 parts of Buna S peels were mixed with 1 part of straight chain lauryl mercaptan, 1.5 parts of engine oil, 1.5 parts of Solvesso No. 3, 0.25 part of oleic acid, 0.75 part of 4-tertiary butyl catechol, and 1.5 parts of water. The jacket temperature was maintained at about 385° F. with a cone temperature of 220° F., and a die temperature of 270° F. The contact time was 9 minutes, and 11 horsepower input. A good reclaim with a plasticity number of about 6.09 and a specific gravity of 1.150 was obtained.

*Example 16*

A product of Process 16, having a Mooney viscosity (ML/180/1.5-1-8) at the time of load testing of 106, assimilated 700 grams of Suprex clay per 500 grams of reclaim, on a 12" x 6" mill, and required a maximum of 4.08 horsepower while mixing in the last 100 grams of this amount, and a maximum of 3.86 horsepower when the load was all mixed in (4% of stearic acid was added on the clay). When this compound was vulcanized (1% of Zenite A, 1% of stearic acid, 3% of zinc oxide, and 3% of sulfur, had been added on an assumed RHC of 50%), for 10 minutes at 307° F., the durometer reading was 89, the tensile strength was 443 p.s.i., and the elongation was 80%.

| Cure, R. A. F. 50% | T | E | H |
|---|---|---|---|
| 20/40 | 1,045 | 263 | 56 |
| 25/40 | 1,054 | 253 | 57 |
| 30/40 | 1,123 | 257 | 58 |

PROCESS 17

In a similar procedure a treatment generally similar to that of Process 16 was carried out with a contact time of 10 minutes, and an input of 12 horsepower hours, 0.5 part of lecithin and 0.2 part of 2-ethyl butyric acid employed in the mix, but no engine oil. Good results were achieved. Good results were likewise obtained using teritary lauryl mercaptan instead of the straight chain lauryl mercaptan.

*Example 17*

The products of Process 17.

| Cure, R. A. F. 50% | T | E | H |
|---|---|---|---|
| 20/40 | 1,385 | 257 | 61 |
| 25/40 | 1,362 | 237 | 60 |
| 30/40 | 1,296 | 220 | 62 |

PROCESS 18

Using a special machine, 95 parts of red inner tube scrap in crumb form of 12 mesh size were mixed with a solution consisting of 3.5 parts of Solvesso No. 3, 1 part of engine oil, and 2 parts of dioctyl disulfide. The resulting mixture was passed through a tubing machine provided with a nozzle having an annular opening a few millimeters in radius and several inches in length electrically heated to bring the composition in the nozzle quickly to a temperature of about 400° F. and to hold it at approximately that temperature until discharged into an inert cooling bath or cooling atmosphere, by which the treatment was quickly terminated. The temperature of the mixture during passage through the nozzle was approximately 407° F. and the approximate transit time within the treating zone 3.1 minutes.

*Example 18*

The product was a reclaim of good quality with plasticity number 5.43.

PROCESS 19

The same mixture as in Process 18 excepting for substitution of an equal amount of di-hexadecyl disulfide instead of the octyl disulfide used in Example 18, was treated in the same manner, excepting that in this case the observed temperature of the main treatment was approximately 400° F. and the approximate time of treatment 3.9 minutes.

*Example 19*

The product was a reclaim of good quality with plasticity number 5.3.

*Example 20*

Using the following formulation:

| | Parts by weight |
|---|---|
| No. 1 natural rubber peels (tire treads peeled from the carcass) ground to size adapted to pass a 24 mesh screen | 95.00 |
| Tertiary dodecyl mercaptan | .50 |
| Petroleum solvent (Solvesso No. 3) | 1.50 |
| Engine oil (Topsall No. 62) | 1.50 |
| Lecithin (Clearate) | .50 |
| Water | 1.50 | the mix was run thru the machine of Fig. 2 at a contact time of 2.91 minutes at 367° F. and a production rate of 62.0 pounds per hour with a worm speed of 60 R. P. M. This reclaim has a specific gravity of 1.122 and a Williams plasticity number of 4.73.

PROCESS 21

Prepared from a mix similar to the formulation in Example 20 except that the tertiary dodecyl mercaptan was increased to 5.0 parts by weight instead of 0.5 part and the engine oil was completely eliminated. This mix was processed in the machine of Fig. 2 for 1.46 minutes at 361° F. and a worm speed of 60 R. P. M., yielding a production rate of 123 pounds per hour.

*Example 21*

The reclaim has a sepcific gravity of 1.120 and a Williams plasticity number of 3.86.

A product of Process 21, having a Mooney viscosity, (ML/180/1.5-1-1) at the time of load testing, of 54, assimilated 500 grams of Suprex clay per 500 grams of reclaim, on a 12" x 6" mill of 1:1.3 roll ratio, and required a maximum of 4.08 horsepower while mixing in the last 100 grams of this amount, and a maximum of 3.86 horsepower when the load was all mixed in (4% of stearic acid was added on the clay).

When this compound was vulcanized (1% of Zenite A, 1% of stearic acid, 3% of zinc oxide, and 3% of sulphur, had been added on an assumed RHC of 50%) for 10 minutes at 307° F., the durometer reading was 80, the tensile strength was 972 p. s. i. and the elongation was 150%.

When cured with 50% RAF the following physicals were obtained:

| | T | E | H | Abrasion loss (8/0-280 paper) | Torsional hysteresis |
|---|---|---|---|---|---|
| 25' 40# | 773 | 333 | 46 | 525 | |
| 30' 40# | 763 | 317 | 45 | 572 | 0.099 |

A thermal softening factor of .266 was obtained from Mooneys (ML/180/6/1-17) of 65.6 and (ML/212/6/1-17) of 57.

This reclaim has a quality factor calculated as follows:

$$\frac{763 \times 317}{572 \times 54} = 7.8$$

Example 22

Prepared from a mix similar to the formulation of Example 20 except that 1.0 part by weight of monomeric styrene was added to the mix. This mix was then processed in the machine of Fig. 2 for 3.09 minutes at 358° F. with a worm speed of 60 R. P. M., yielding a production rate of 58.2 pounds per hour. The reclaim has a specific gravity of 1.121 and a Williams plasticity number of 4.19.

PROCESS 23

| Formulation | Parts by weight |
|---|---|
| No. 1 natural peels, 24-mesh | 95.00 |
| Terpinolene | 1.25 |
| Styrene monomer | 1.00 |
| Solvesso No. 3 | 1.00 |
| Engine oil | 1.50 |
| Lecithin | .50 |
| Water | 1.50 |

Process.—2.5 minutes at 365° F. in the machine of Fig. 2 at a worm speed of 60 R. P. M. 70 pounds per hour. Refined 0.003″ maximum.

Example 23

The product of Process 23.

PROCESS 24

Formulation:
| | |
|---|---|
| 67% mixed beadless tires<br>6% S-3 beadless<br>27% 70 grade peels | 100.0 |
| Tertiary dodecyl mercaptan | 1.0 |
| Petroleum resin (PDO-40) | 5.0 |
| Petroleum asphalt (No. 3186 resin) | 5.0 |
| Hydrocarbon solvent (Esso 200) | 2.0 |

The above mix was processed in the plasticator of Figure 2, at 69.4 pounds per hour, at a temperature of 303° F., and a worm speed of 60 R. P. M.

Example 24

The product of Process 24.

Raw.—A soft, tacky reclaim with a Williams plasticity of 4.70 (3 minutes at 70° C.) and a Mooney viscosity (ML/180/1.5-1) of 62.

Chemical analysis (partial):
| | |
|---|---|
| Total hydrocarbon | 49.0 |
| Rubber hydrocarbon | 34.0 |
| GR-S | 15.0 |

Cured in the Reclaimers' Association Formula:
| | |
|---|---|
| Reclaim | 200.0 |
| Zinc oxide | 5.0 |
| Mercaptobenzo thiozole | .5 |
| Di-phenyl guanidine | .2 |
| Stearic acid | 2.0 |
| Sulfur | 3.0 |

| Cure at 287° F. | Tensile | Elongation | Hardness | Abrasion loss, cc./H. P. H. |
|---|---|---|---|---|
| 25 minutes | 874 | 357 | 45 | .530 |
| 30 minutes | 900 | 340 | 46 | .512 |
| 35 minutes | 927 | 337 | 47 | .497 |

The load testing demonstrated that this reclaim could assimilate 600 grams of Suprex clay per 500 grams of reclaim, on a 12″ x 6″ laboratory mill, having a roll speed ratio of 1.33:1, and using 5.04 horsepower while mixing in the last 100 grams increment of this load, and 4.83 horsepower when the load was mixed in (4% of stearic acid was added on the clay). This reclaim could assimilate 450 grams of a semi-reinforcing furnace black (Furnex) per 500 grams of reclaim on the mill described above, and requiring 6.66 horsepower while mixing in the last 75 gram increment, and 5.71 horsepower when mixed. This reclaim has a quality factor, described by the term:

$$\frac{\text{Tensile} \times \text{elongation}}{\text{Abrasion loss} \times \text{Mooney viscosity}}$$

as follows: (Cure 30 minutes @ 287° F.)

$$\frac{900 \times 340}{512 \times 62} = 9.6$$

PROCESS 25

A mix composed of:
| | |
|---|---|
| 24 mesh No. 1 recap peels | 95.00 |
| Tertiary dodecyl mercaptan | 1.00 |
| Lecithin | .50 |
| No. 132 solvent | 1.50 |
| PRR No. 1 | 9.75 | was processed in the machine of Fig. 3, operating at 40 R. P. M. for three minutes at 410° F. at a rate of 300 pounds per hour and refined at 0.0035 inch maximum.

Example 25

A product of Process 25.

Analysis:
| | |
|---|---|
| Acetone extracts | 17.83 |
| Chloroform extract | 4.13 |
| Alcoholic KOH extract | .99 |
| Free sulfur | .15 |
| Combined sulfur | 1.68 |
| Total sulfur | 1.83 |
| Free carbon | 22.97 |
| Cellulose | .42 |
| Ash | 6.11 |
| Rubber hydrocarbon (difference) | 45.72 |
| Rubber hydrocarbon (direct) | 28.08 |
| Acidity (4 hr. boil) | .017 |
| Specific gravity | 1.17 |

Evaluation Formula:
| | |
|---|---|
| Smoked sheets | 38.00 |
| Sulfur | 4.30 |
| Zinc oxide | 5.45 |
| EP channel black | 19.6 |
| Captax | .75 |
| Thin pine tar | 3.15 |
| Stearic acid | 3.00 |
| Sample | 113.00 |

| Test | Cure at 260° F. | Orig. | Aged |
|---|---|---|---|
| Modulus 300% | 25 | 600 | 1,250 |
| | 50 | 700 | 1,650 |
| | 100 | 1,050 | 2,075 |
| Tensile | 25 | 1,500 | 2,200 |
| | 50 | 2,050 | 2,150 |
| | 100 | 2,350 | 2,150 |
| Elongation | 25 | 555 | 485 |
| | 50 | 500 | 380 |
| | 100 | 440 | 310 |
| Specific gravity | | 1.155 | |
| Reb. defl. (unaged): | | | |
| Rebound | | 58.5 | |
| Deflexion | | .254 | |
| Reg. flex. (66% unaged) | | 82 | |
| Williams plast. (70° C.): | | | |
| 0-hours | | 277–28 | |
| 4-hours | | 329–66 | |
| 10-hours | | 366–157 | |
| Abrasion (Bureau of Standards) | 50 | 79.6 | |
| Compression set (ASTM-B)—22 hours at 158° F | | Set 55 (¹) | Shore 66.4 (¹) |

¹ Tread.

PROCESS 26

A mix composed of:

| | |
|---|---|
| 24 mesh GR-S whole tire scrap | 95.00 |
| Tertiary dodecyl mercaptan | 1.00 |
| PRR | 14.00 |
| Lecithin | .50 |
| Water | 1.50 | was processed in the machine of Fig. 3.

Example 26

A product of Process 26.
Analysis:

| | |
|---|---|
| Acetone extract | 21.36 |
| Chloroform extract | 4.87 |
| Alcoholic KOH extract | 1.03 |
| Free sulfur | .16 |
| Combined sulfur | 1.72 |
| Total sulfur | 1.88 |
| Free carbon | 20.89 |
| Cellulose | 1.60 |
| Ash | 6.93 |
| Rubber hydrocarbon (difference) | 41.44 |
| Rubber hydrocarbon (direct) | 13.32 |
| Acidity (4-hour boil) | .013 |
| Specific gravity | 1.16 |

Evaluation formula:

| | |
|---|---|
| Smoked sheets | 33.00 |
| Sulfur | 4.30 |
| Zinc oxide | 5.45 |
| EP channel black | 19.65 |
| Captax | .75 |
| Thin pine tar | 3.10 |
| Stearic acid | 3.00 |
| Sample | 113.00 |

| Test | Cure at 260° F. | Orig. | Aged |
|---|---|---|---|
| Modulus 300% | 25 | 400 | 800 |
| | 50 | 775 | 1,250 |
| | 100 | 1,075 | 1,500 |
| Tensile | 25 | 1,075 | 1,500 |
| | 50 | 1,650 | 1,725 |
| | 100 | 1,775 | 1,775 |
| Elongation | 25 | 550 | 470 |
| | 50 | 490 | 395 |
| | 100 | 435 | 345 |
| Specific gravity | | 1.155 | |
| Rebound-deflexion (unaged): | | | |
| Rebound | | 65 | 52.0 |
| Deflexion | | 65 | .261 |
| Reg. flex. (66% unaged) | | 50 | 74 |
| Williams plast. (70° C.): | | | |
| 0 hours | | | 280-26 |
| 4 hours | | | 317-68 |
| 10 hours | | | 340-131 |
| Abrasion (Bureau of Standards) | | 50 | 56.7 |
| Comp. set (ASTM-B)—22 hours at 158° F | | Set 50 | Shore |
| | | 52 (1) | 69.2 (1) |

1 Whole tire.

PROCESS 27

Formulation:

| | |
|---|---|
| 67% mixed tires | |
| 6% GR-S tires | |
| 27% 70 grade peels (in which the natural rubber content is approximately 70% of the total hydrocarbon). defiberized and ground to 18 mesh | 100.0 |
| Tertiary dodecyl mercaptan | .8 |
| PDO-40 | 4.0 |
| No. 3186 resin | 4.0 |
| Esso 200 | 1.6 |
| Clay | 3.0 |
| BRC-30 (coal tar hydrocarbon sp. g. 1.25–1.32) | 4.0 |

The above mix was processed in a machine similar to the plasticator of Figure 2, having a feed screw of four times the diameter, and 4.5 times the length, at a rate of 1450 pounds per hour, and a worm speed of 20 R. P. M. The resulting raw product was refined once through rolls set at .0035" maximum.

Example 27

The resulting finished product had a Williams plasticity, 3 minutes at 70° C., of 3.78, and when cured in the Rubber Reclaimers' Association Formula at 50% rubber hydrocarbon for 30 minutes at 40 pound steam pressure, the physical properties were as follows:

| Tensile | Elongation | Shore hardness | Specific gravity |
|---|---|---|---|
| 615 | 283 | 46 | 1.171 |

A product of Process 27, having a Mooney viscosity (ML/180/1.5–1) at the time of load testing of 26 assimilated 700 grams of Suprex clay per 500 grams of reclaim, on a 12" x 6" mill, and required a maximum of 4.02 horsepower while mixing in the last 100 grams of this amount, and a maximum of 3.81 horsepower when the load was all mixed in (4% of stearic acid was added on the clay). When this compound was vulcanized (1% of Zenite A, 1% of stearic acid, 3% of zinc oxide, and 3% of sulfur, had been added on an assumed RHC of 50%), for 10 minutes at 307° F., the durometer reading was 80, the tensile strength was 622 p. s. i., and the elongation was 115%.

A product of Process 27, having Mooney viscosities (15 days) (Ml/180/1.5–1) of 27½, (ML/180/3–1) of 23, (ML/180/6–1) of 21; and a Mooney viscosity (ML/212/1.5–1) of 21, (ML/212/3–1) of 18½, (ML/212/6–1) of 17; and a Mooney viscosity (ML/244/1.5–1) of 19, (ML/244/3–1 of 16½, and (ML/244/6–1) of 15; and a Mooney viscosity (ML/160/1.5–1) of 36½, (ML/160/3–1) of 29½, (ML/160/6–1) of 26. This product had a thermal softening factor of 0.25 between ML/160/6–1 and ML/180/6–1; a thermal softening factor of 0.13 between ML/180/6–1 and ML/212/6–1; a thermal softening factor of 0.062 between ML/212/6–1 and ML/244/6–1; and an overall thermal softening factor of 0.131 between ML/160/6–1 and ML/244/6–1.

PROCESS 28

100 parts of 24 mesh GR-S whole tire scrap (fiber free) were mixed with 1.0 part of tertiary dodecyl mercaptan, 1.5 parts of petroleum solvent and 14.75 parts of P. R. R. #1, and processed through the machine of Figure 3, at a rate of 217 pounds per hour, at a temperature of 394° F. The resulting raw product was then refined once through rolls set at .0035" maximum.

Example 28

The final product was a smooth reclaim having a Williams plasticity number of 5.10, for 3 minutes at 70° C. This reclaim (specific gravity 1.137) when cured in the Reclaimers' Association Formula for 50% rubber hydrocarbon for the times shown at 40 p. s. i. had the following physical properties:

| | Tensile | Elongation | Hardness | Abrasion |
|---|---|---|---|---|
| 25 min. at 40 p. s. i. | 637 | 333 | 39 | |
| 30 min. at 40 p. s. i. | 705 | 330 | 40 | 642 |

A product of Process 28, having a Mooney viscosity (ML/160/1.5–1) of 44½ (ML/160/3–1) of 35½, (ML/160/6–1) of 30; and a Mooney viscosity (ML/180/1.5-1) of 32¼, (ML/180/3-1) of 27, and (ML/180/6-1) of 24; and a Mooney viscosity (ML/212/1.5-1) of 26, (ML/212/3-1) of 22½, (ML/212/6-1) of 20½; and a Mooney viscosity (ML/244/1.5-1) of 24, (ML/244/3-1) of 20½, (ML/244/6-1) of 18½. This product had a thermal softening factor of 0.11 between (ML/180/6-1) and (ML/212/6-1); and a thermal softening factor of 0.062 between (ML/212/6-1) and (ML/244/6-1); and an over all thermal softening factor of 0.14 between (ML/160/6-1) and (ML/244/6-1). The quality factor is calculated as follows:

$$\frac{705 \times 330}{32.25 \times 642} = 11.2$$

PROCESS 29

100 parts of 12 mesh natural rubber black inner tubes were mixed with 0.5 part of tertiary dodecyl mercaptan and 1.5 parts of petroleum solvent, and processed at a rate of 350 pounds per hour in the machine of Figure 3. The contact time was 2.56 minutes, and the temperature was 353° F. The resulting product was given a single refining at .0035" maximum.

Example 29

A product of Process 29, having Mooney viscosities (15 days) (ML/180/1.5-1) of 28, (ML/180/3-1) of 25, (ML/180/6-1) of 22; and a Mooney viscosity (ML/212/1.5-1) of 23, (ML/212/3-1) of 21, and (ML/212/6-1) of 18. This product had a thermal softening factor of 0.13 between (ML/180/6-1) and (ML/212/6-1). Specific gravity, 1.142.

This product had the following physical properties:

| R. A. F. 70% | Tensile | Elongation | Hardness |
|---|---|---|---|
| | Pounds | Percent | |
| 7½ min. at 40# | 917 | 487 | 36 |

PROCESS 30

Formulation:
| | |
|---|---|
| 90¹ grade peels, 18 mesh | 100.0 |
| Tertiary dodecyl mercaptan | .5 |
| Esso 200 | 1.1 |
| PDO-40 | 6.4 |
| Clay | 3.0 |
| BRC-30 | 4.0 |

¹ Approximately 90% of the rubber hydrocarbon is natural.

The above mix was processed in a machine similar to the plasticator of Figure 2, but having a feed screw of four times the diameter, and 4.5 times the length, at a rate of 1250 pounds per hour, and a worm speed of 20 R. P. M. The resulting raw product was refined once through rolls set at .0035" maximum.

Example 30

The finished reclaim had a Williams plasticity of 3.34 for 3 minutes at 70° C. When cured in the Rubber Reclaimers' Association Formula at 50% rubber hydrocarbon, and cured for 30 minutes at 40 p. s. i. steam, the reclaim had the following physical properties:

| | Tensile | Elongation | Shore hardness | Specific gravity |
|---|---|---|---|---|
| 30 min. at 40 p. s. i | 824 | 323 | 42 | 1.150 |

A product of Process 30 having a Mooney viscosities (8 days) (ML/180/1.5-1) of 26, (ML/180/3-1) of 21, (ML/180/6-1) of 18; and a Mooney viscosity (ML/212/1.5-1) of 17, (ML/212/3-1) of 16, (ML/212/6-1) of 14. This product had a thermal softening factor of 0.13 between ML/180/6-1 and ML/212/6-1.

While there are given above certain specific examples of this invention and its application in practical use and also certain modifications and alternatives, it should be understood that these are not intended to be exhaustive or to be limiting of the invention. On the contrary, these illustrations and the explanations herein are given in order to acquaint others skilled in the art with this invention and the principles thereof and a suitable manner of its application in practical use, so that others skilled in the art may be enabled to modify the invention and to adapt it and apply it in numerous forms, each as may be best suited to the requirement of a particular use.

The term "vulcanized rubber" as used in the appended claims is intended to include products drived from or comprising natural or synthetic diolefin polymer materials, butyl rubber, and mixtures thereof with each other, and/or with other materials as commonly found or dealt with in the commercial rubber art.

Certain subject matter disclosed but not claimed herein is claimed in certain of our copending applications as follows: 38,474, July 13, 1948; 193,669, November 2, 1950; 193,688, November 2, 1950; 203,257, December 29, 1950; 233,446, June 25, 1951; 246,327, September 12, 1951; 246,328, September 12, 1951.

The term "polymeric" as used in the appended claims is to be understood in its generic sense as referring to co-polymers—or inter-polymers—(of which GR-S is an example), as well as to polymers formed from a single monomer (of which natural rubber is an example) and to mixtures and combinations thereof.

We claim:

1. A reclaimed material formed from sulfur-vulcanized rubbery hydrocarbon polymeric scrap, at least 50% of the monomeric units of the rubbery hydrocarbon polymeric material therein being from the group consisting of butadiene and isoprene, said reclaim retaining substantial amounts of combined sulfur of vulcanization, and having a specific gravity of not over about 1.20, and a Mooney (ML/180/1.5-1) viscosity of from about 32 to about 71 and having when cured in the Reclaimers' Association Formula (50%) for 30 minutes at 287° F. a tensile strength of at least about 705 p. s. i., a percent elongation of at least about 240, an abrasion loss (cc./h. p. h. 8/0–280 paper) of not over about 642, and giving a quality factor defined as $$\frac{\text{tensile strength} \times \text{percent elongation}}{\text{Mooney (ML/180/1.5-1) viscosity} \times \text{abrasion loss}}$$

of at least 7.8, said material having been prepared by mechanical working of the scrap under compacting pressure while passing thru a zone under conditions whereby heat generated by the working is accumulated to raise the temperature to not substantially less than 325° F. as it moves forward progressively at a rate of at least 40 pounds per hour in the presence of a chemical plasticizing agent and a physical softener, followed by cooling during the progressive movement thereof.

2. A reclaimed material as set forth in claim 1 which has a thermal softening factor one thirty-second of the difference between the ML/180/6-1 Mooney viscosity and the ML/212/6-1 Mooney viscosity of not over about 0.37.

3. A reclaimed material as set forth in claim 1 which has a modulus of not over about 1000.

4. A reclaimed material as set forth in claim 1 which has a T-50 minus value which is no nearer zero than about minus 16.

5. A reclaimed material as set forth in claim 1 in the formation of which the chemical agent comprises an aliphatic mercaptan containing not less than 10 carbon atoms.

6. A reclaimed material as set forth in claim 5 wherein the mercaptan contains 12 carbon atoms.

7. A reclaimed material as set forth in claim 6 in the formation of which the chemical agent comprises monomeric styrene.

8. The process of plasticizing vulcanized rubber and like material which comprises progressively working the material in an extended form of thin cross-section under compacting pressure with substantial exclusion of air under conditions whereby heat generated by the working is accumulated to raise the temperature to not substantially less than 325° F., moving the material forward progressively while it is worked, maintaining the temperature between about 325° F. and 425° F., and progressively cooling the material at a succeeding stage in its progressive movement.

9. A process as set forth in claim 8 wherein the material is comminuted prior to the progressive working, is mixed with ingredients adapted to facilitate plasticizing, and is extruded in thinner cross-section following the progressive working and forward movement thereof.

10. A process as set forth in claim 8 wherein the material is worked together with ingredients adapted to facilitate plasticizing, and wherein said progressive cooling takes place while air is substantially excluded.

11. A process as set forth in claim 8 wherein said progressive cooling takes place while air is substantially excluded, and wherein the material is further cooled thereafter by flowing a stream of cooling fluid thereover.

12. A process as set forth in claim 8 wherein the material is worked together with ingredients adapted to facilitate plasticizing, and wherein the temperature is maintained between 380° F. and 410° F. during the progressive working.

13. In the method of extrusion in which a screw rotated within an extrusion cylinder is operative to cause heat-plasticizable material which is fed to the cylinder to be forced therethru and to be plasticized and worked during the course of its flow, such working of the material generating heat, the steps of progressively working the material in an extended form of thin cross-section under compacting pressure with substantial exclusion of air under conditions whereby heat generated by the working is accumulated to raise the temperature to not substantially less than 325° F., maintaining the temperature between about 325° F. and 425° F., adjusting the power input of said forcing and working actions to at least 0.1 horsepower hours per pound of material, cooling the worked material before discharge to reduce the temperature of the product and withdrawing the material continuously.

14. A process as set forth in claim 8 wherein the material is progressively worked in the presence of a reclaiming agent for a period of substantially one to twenty minutes.

15. A process as set forth in claim 8 wherein the material is comminuted and mixed with a chemical plasticization agent at a temperature not exceeding 250° F. before it is subjected to said compacting pressure with exclusion of air.

16. In the method of extrusion in which a screw rotated within an extrusion cylinder is operative to cause heat-plasticizable material which is fed to the cylinder to be forced therethru and to be plasticized and worked during the course of its flow, such working of the material generating frictional heat, the steps of progressively working the material in an extended form of thin cross-section under compacting pressure with substantial exclusion of air under conditions whereby heat generated by the working is accumulated to raise the temperature to not substantially less than 325° F., maintaining the temperature between 325° F. and 425° F. for from two to ten minutes at a power input of from 0.15 to 0.83 horsepower hours per pound of material as the material is progressively moved forward and worked, and progressively extruding and cooling the material at the end of said working and forward movement.

17. A process as set forth in claim 8 wherein a plurality of different conjugated diolefine polymer materials are progressively worked together in the presence of at least one reclaiming agent.

18. A process as set forth in claim 8 wherein the material being progressively worked is repeatedly kneaded in the presence of a chemical plasticization agent.

19. A process as set forth in claim 8 wherein the material is progressively worked in the presence of a relatively small percentage of an aliphatic mercaptan.

20. A process as set forth in claim 8 wherein heat is externally applied to the material at an early stage of the process.

21. A process as set forth in claim 8 wherein the progressive working and forward movement involves an energy input of from about 0.15 to about 0.83 horsepower hours per pound of material, and wherein air is excluded during said progressive cooling.

22. A process as set forth in claim 8 wherein the temperature is maintained in range of from about 380° F. to about 410° F. for from two to three minutes.

23. A process as set forth in claim 8 wherein the progressive working and forward movement is completed in less than three minutes.

24. A process as set forth in claim 18 wherein the chemical plasticization agent comprises monomeric styrene.

25. A reclaimed material as set forth in claim 1 wherein the rubbery hydrocarbon polymeric material comprises a copolymer.

26. A reclaimed material as set forth in claim 1 wherein the rubbery hydrocarbon polymeric material comprises a homopolymer.

27. A reclaimed material as set forth in claim 1 wherein the rubbery hydrocarbon polymeric material comprises a mixture of natural rubber and a butadiene-styrene copolymer.

JOSEPH C. ELGIN.
EDWARD F. SVERDRUP.

(References on following page)

References Cited in the file of this patent

UNITED STATES PATENTS

| Number | Name | Date |
|---|---|---|
| 866,759 | Wheeler | Sept. 29, 1907 |
| 1,133,952 | Gare | Mar. 30, 1915 |
| 1,963,943 | Gross | June 19, 1934 |
| 2,372,584 | Kirby | Mar. 27, 1945 |
| 2,408,296 | Cotton et al. | Sept. 24, 1946 |
| 2,415,449 | Sverdrup | Feb. 11, 1947 |
| 2,461,192 | Banbury et al. | Feb. 8, 1949 |
| 2,477,809 | Kelly | Aug. 2, 1949 |
| 2,494,593 | Sverdrup | Jan. 17, 1950 |
| 2,545,828 | Randall | Mar. 20, 1951 |
| 2,612,479 | Kirby et al. | Sept. 30, 1952 |

OTHER REFERENCES

Kilbourne et al.: Rubber Age, January 1950, pp. 423 to 428.